(12) United States Patent
McRae et al.

(10) Patent No.: US 8,502,925 B2
(45) Date of Patent: Aug. 6, 2013

(54) TELEVISION PROGRAMMING OF A REMOTE CONTROL

(75) Inventors: Matthew Blake McRae, Laguna Beach, CA (US); Peter Jay Schwartz, Fullerton, CA (US)

(73) Assignee: Vizio Inc., Irvine, CA (US)

( * ) Notice: Subject to any disclaimer, the term of this patent is extended or adjusted under 35 U.S.C. 154(b) by 745 days.

(21) Appl. No.: 12/648,322

(22) Filed: Dec. 29, 2009

(65) Prior Publication Data

US 2011/0157478 A1 Jun. 30, 2011

(51) Int. Cl.
  *H04N 5/44* (2006.01)
  *H04N 5/46* (2006.01)
  *H04N 5/268* (2006.01)
  *H04N 5/50* (2006.01)
  *G09G 5/00* (2006.01)
  *G09G 5/08* (2006.01)
  *G06F 3/033* (2006.01)
  *G08C 19/16* (2006.01)
  *G08C 19/12* (2006.01)
  *G05B 19/18* (2006.01)

(52) U.S. Cl.
  USPC ........... 348/734; 348/558; 348/705; 348/569; 345/169; 345/158; 345/179; 340/12.22; 340/12.52; 340/13.3; 700/65

(58) Field of Classification Search
  USPC .......... 340/12.28, 12.22, 12.23, 12.52, 854.9, 340/856.3, 825.49, 825.72, 539.1, 3.2, 500, 340/548; 345/169, 156, 179, 173, 157; 341/23, 341/173, 176; 348/734, 705, 569, 558; 700/65, 700/9, 13, 17, 19, 20
  See application file for complete search history.

(56) References Cited

U.S. PATENT DOCUMENTS

| | | | |
|---|---|---|---|
| 2002/0042915 A1* | 4/2002 | Kubischta et al. | 725/38 |
| 2003/0151538 A1* | 8/2003 | Escobosa et al. | 341/176 |
| 2005/0052423 A1* | 3/2005 | Harris et al. | 345/169 |
| 2005/0080496 A1* | 4/2005 | Hayes et al. | 700/65 |
| 2005/0212767 A1* | 9/2005 | Marvit et al. | 345/158 |
| 2006/0150120 A1* | 7/2006 | Dresti et al. | 715/810 |
| 2007/0097273 A1* | 5/2007 | Pfiffer | 348/734 |
| 2009/0239587 A1* | 9/2009 | Negron et al. | 455/566 |
| 2010/0013998 A1* | 1/2010 | Mortensen | 348/558 |
| 2010/0309398 A1* | 12/2010 | Klement et al. | 349/33 |

* cited by examiner

*Primary Examiner* — Jennifer Mehmood
*Assistant Examiner* — Mirza Alam
(74) *Attorney, Agent, or Firm* — Law Office of Scott C. Harris, Inc.

(57) ABSTRACT

A television includes a television with a remote control. A user interface running on the television ascertains a brand and model number of a device that is to be operated by the remote control and after responsive to such; the television transmits commands to the remote control to program the remote control, thereby enabling the remote control to control the device.

11 Claims, 10 Drawing Sheets

| CM5 | |
|---|---|
| B-Name | B-Val |
| VCTRL | 3A20 |
| CCTRL | 3A2F |
| ONOFF | 3AE2 |
| 1 | 2C01 |
| 2 | 2C02 |
| ⋮ | ⋮ |

FIG.4

| CM5 | |
|---|---|
| B-Name | B-Val |
| VCTRL | 2F20 |
| CCTRL | 3A2F |
| ONOFF | 3AE2 |
| 1 | 2C01 |
| 2 | 2C02 |
| ⋮ | ⋮ |

FIG.5

TELEVISION PROGRAMMING OF A REMOTE CONTROL

FIELD

This invention relates to the field of televisions and more particularly to a system for programming a remote control by way of a user interface operating on the television.

BACKGROUND

Television devices such as LCD or Plasma televisions are becoming more sophisticated each year. Already, most have a processor and memory and a remote control as an input device.

Soon, many television devices will have Internet connections and mass storage devices (e.g., disk drives). The Internet connection and storage will be used for many purposes, including the download and storage of content (e.g., movies). The television devices have or will have input ports or other types of connections, either wired or wireless for the connection of devices such as phones, cameras, storage devices, printers, music players, etc.

In some homes and businesses, the television is simply connected to a content source such as cable or, simply an antenna. Recently, more often, there are many other devices connected to a television. For example, in order to receive high-definition television broadcasts, the television is often connected to a set-top box. Due to the limited speaker size and audio capabilities of most televisions, they are often connected to external amplifiers and speaker systems. Other forms of content delivery devices are often connected to the television such a disk players (DVD, Blueray), Video Cassette Recorders (VCR) and music/video players.

Most of these connected devices operate independently and are unaware of each other. For example, when the television changes from an input connected to a game system to an input connected to movie content, the amplifier is not aware of the change and does not alter its settings.

Almost every television produced has some form of remote control. A large majority of the remote controls use infrared to wirelessly transmit command signals to the television. Additionally, many of the devices connected to the television also have remote controls. Such often results in a household having many remote control devices, one for the television, one for the external amplifier/receiver, one for the set-top box, one for the disk player, etc.

Even though most devices are provided with a remote control, attempts have been made to reduce the number of active remote controls needed in any given system to one remote control. This is often referred to as a Universal Remote Control (e.g., it is capable of controlling many different devices). The goal is to have one remote control that is able to command several devices, including the television.

A universal remote is a remote control that can be programmed to operate various brands or types of devices. An early universal remote was described in U.S. Pat. No. 4,774,511 to Rumbolt, et al. Today, many remote controls provided with televisions, set-top boxes, etc., provide some form of a universal remote function. Many of these remotes have mode buttons to select which particular device is being controlled and function buttons, the button that initiates an action. The mode buttons are often labeled "TV", "VCR", "DVD", "AUX," etc. The intent is that, after pressing one of the mode buttons, the remote control is configured to send commands to that device. The function buttons are often labeled with numbers, letters and symbols indicating their respective commands such as the digits 0-9, symbols for play, stop, pause, etc. For example, to change the channel on a TV, the "TV" mode button is pressed and then the digits of the desired channel are pressed.

With current remote control technology each manufacturer uses a specific set of commands between their remote controls and their devices. Therefore, the universal remote control must be told which set of commands are used for each device it is to control. This is often accomplished by using a paper (or on-line) table organized by type of device (e.g., television, set-top box, disk player, etc.) then manufacturer. The table then contains one or more 3-digit or 4-digit codes for that type of device and manufacturer. For example, an X10 universal remote, model UR74A lists, under televisions, approximately 100 manufacturers, one of which is Zenith. Under Zenith, there are ten different 3-digit codes. To program this universal remote to control a Zenith television, specific key sequences are entered followed by one of these ten 3-digit codes, then the universal remote is tested to see if that code is correct (e.g., it turns on the television). These tables are often out-dated, for example, the table referenced above does not contain any entries for Vizio and several other manufacturers, even though, televisions produced by such manufacturers are capable of responding to these same infrared code sets.

Another way to program a universal remote control is through a learning mode. In this, the universal remote control has an infrared receiver and is placed in the learn mode, for example, to learn the code set used by a particular television. Then, the remote control provided with that device (television) is aimed at the infrared receiver and the universal remote control receives the commands and determines which code set is to be used to control that device (television).

All of this results in a remote control that, after pressing the appropriate mode button, controls a particular device. In this, if you have a television connected to a set-top box, you must press the set-top box mode button to change channels then the television mode button to change the volume, brightness, etc. Some recent remote controls are programmable so that the volume keys always control a particular device (e.g., the television or external amplifier) irrespective of which mode button has been pressed.

The programming of these remote controls is not easy, often requiring pressing of multiple keys simultaneously and/or holding keys for a minimum amount of time. Feedback from such operations is often limited to blinking of a status light.

What is needed is a television system that will provide user interfaces to program such a universal remote control, thereby improving the user experience.

SUMMARY

The present invention includes a television with a remote control. A user interface running on the television is provided to determine what devices are to be operated by the remote control and, after a user enters these devices in the user interface, the television transmits commands to the remote control to program it to operate with those devices.

For example, a Marantz stereo receiver/amplifier model MJ2002 and a Toshiba T-101 DVD disk player are associated with the television. The user interface is provided by the television and a user enters the device type (e.g., stereo receiver/amplifier), the manufacturer (e.g., Marantz) and the model (e.g., MJ2002). Information regarding the devices is used to determine the appropriate command set and commands are sent to the remote control to program the remote control to properly control these devices.

In one embodiment, a system for programming a remote control is disclosed including a bi-directional interface between a television and the remote control and a mechanism for determining a code set for a particular device to be controlled by the remote control. The system also includes a mechanism for transmitting the code set from the television to the remote control.

In another embodiment, a method of programming a remote control associated with a television is disclosed including providing a bi-directional interface between the television and the remote control. A code set for a particular device to be controlled by the remote control is determined and the code set is transmitted from the television to the remote control over the bi-directional interface.

In another embodiment, a television is disclosed including a display panel with a processing element interfaced to the display panel. A remote control is wirelessly interfaced to the television over a bi-direction interface. A table interfaced to the processing element contains a plurality of entries, each entry representing a device type, a manufacturer, a model number and a remote control code set. There is a mechanism for selecting one of the entries in the table and for transmitting the remote control code set of the entry from the television to the remote control.

BRIEF DESCRIPTION OF THE DRAWINGS

The invention can be best understood by those having ordinary skill in the art by reference to the following detailed description when considered in conjunction with the accompanying drawings in which:

FIG. 4 illustrates a first data structure of a typical remote control.

FIG. 5 illustrates a second data structure of a typical remote control.

DETAILED DESCRIPTION

Figure 1:
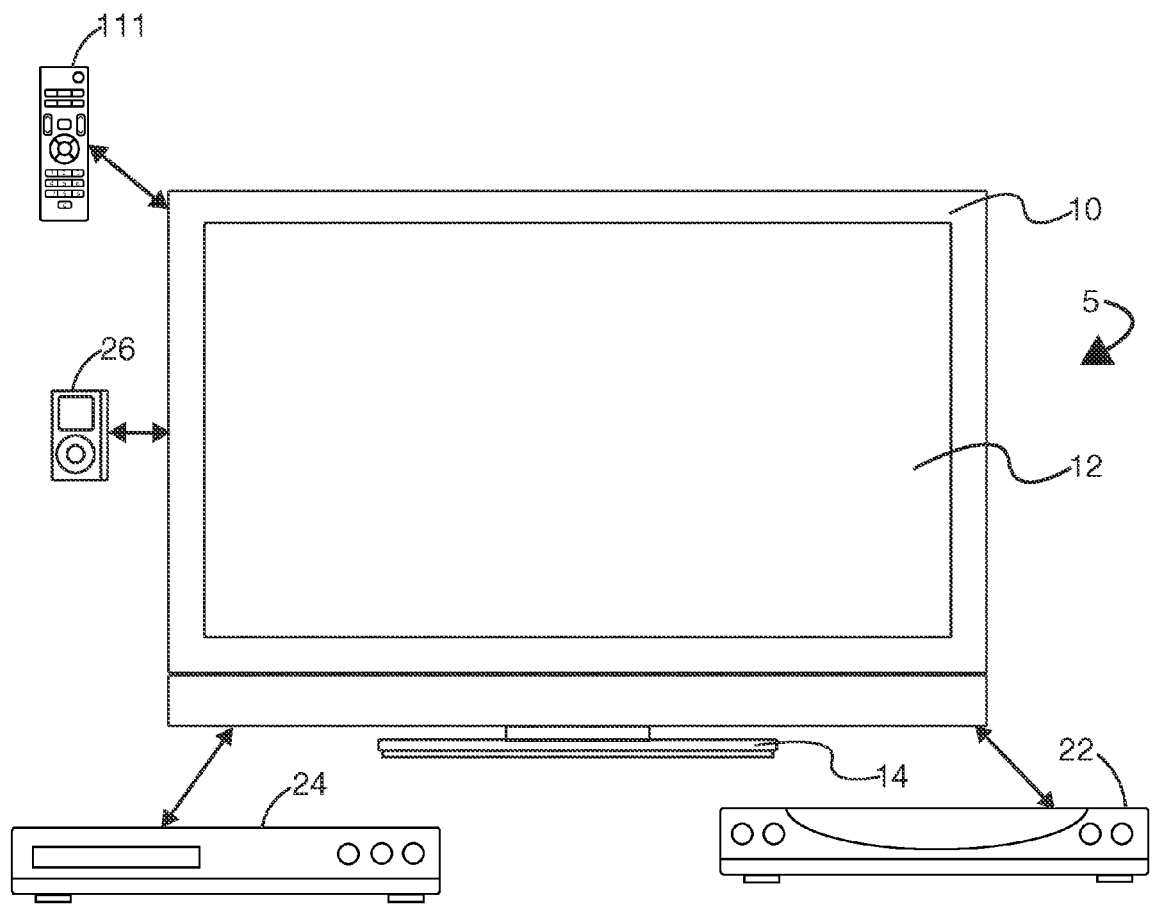
FIG. 1 illustrates a simplified schematic view of a television connected to several devices.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of a television 5 will be described. A typical television 5 has some sort of display panel 12, for example, a liquid crystal display (LCD) panel, a Plasma panel, an array of light emitting diodes (LEDS), a CRT and an organic LED (OLED), etc. Usually, the display panel 12 is bordered by a bezel 10 to cover the frame and/or electronics of the display panel 12. In some embodiments, the television 5 is supported by a base 14.

A remote control 111 is wirelessly interfaced to the television 5. The wireless interface is any known wireless interface including, but not limited to, infrared, IRDA, Bluetooth, radio frequency, ultra-wide band RF, WiFi/802.11, ultrasonic, any form of light, etc.

In addition, several devices 22/24/26 are interfaced to the television 5. In this example, a set-top box 22, a disk player 24 and an audio/video player 26 are interfaced to the television 5 for example purposes. Any number of devices and types of devices are anticipated by the present invention.

In this example, the remote control 111 is a universal remote control and is capable of controlling at least the television and one other of the devices 22/24/26.

Figure 2:
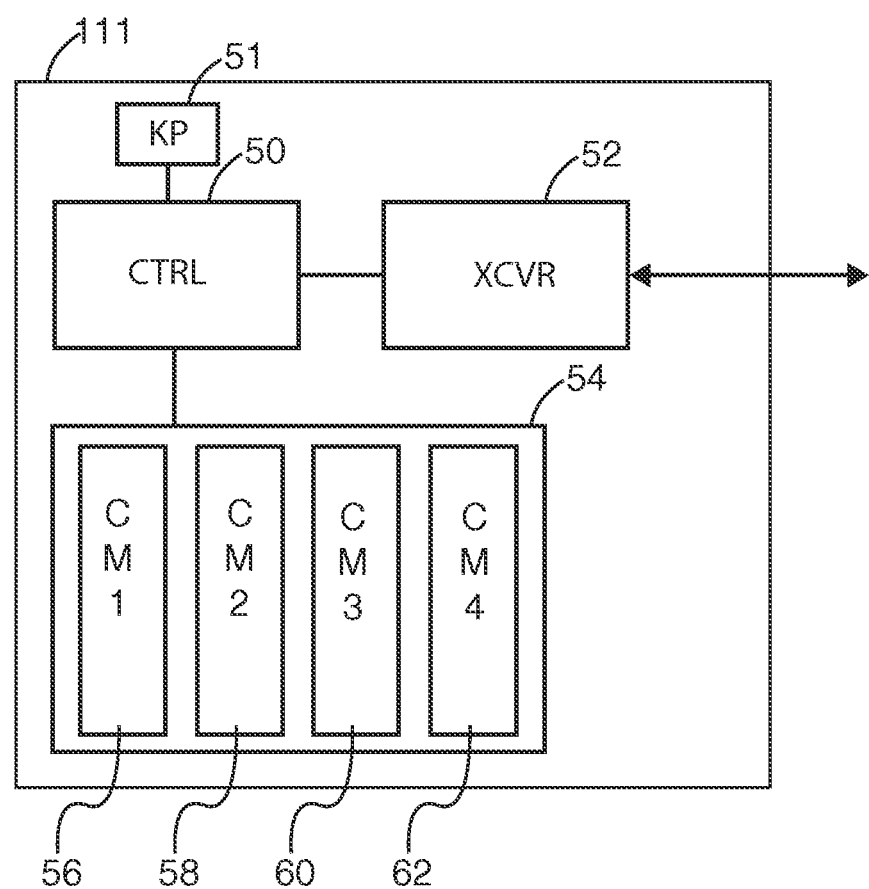
FIG. 2 illustrates a schematic view of a typical remote control.

Referring to FIG. 2, a schematic view of a typical remote control will be described. A typical remote control 111 includes a keypad 51. The keypad 51 is scanned by the controller 50 to determine which key has been pressed. The controller has a dataset of code sets 54 shown greatly simplified. Each code set 56/58/60/62 is associated with a particular device type and code set index (e.g., device-type is VCR and code set index is 3021). Manufacturers of devices use one or a few code sets to control their devices. For example, Sony TVs use code set indexes 002 and 008.

In some remote controls 111, a single button results in the sending of multiple commands. For example, in some remote controls 111, the on/off button 120 initiates the transmission of a sequence of on/off commands, each on/off command specific to each of the multiple controlled devices.

In this exemplary embodiment, to control a first device, such as a VCR, a user presses the "VCR" button 122 (see FIG. 3) on the keypad 51 and the controller 50 recognizes this event and addresses the code set for the currently programmed VCR (for example, CM1 56). After this, pressing of function buttons (e.g., channel up 126—see FIG. 3) result in the controller 50 looking up the associated channel-up command representation from CM1 56 and sending it to the VCR 5 through the transceiver 52. To control a second device, such as a television, the user presses the "TV" button 123 (see FIG. 3) on the keypad 51 and the controller 50 recognizes this event and addresses the code set for the currently programmed television (for example, CM2 58). After this, pressing of function buttons (e.g., channel up 126—see FIG. 3) result in the controller 50 looking up the associated channel-up command representation from CM2 58 and sending it to the television 5 through the transceiver 52.

Figure 3:
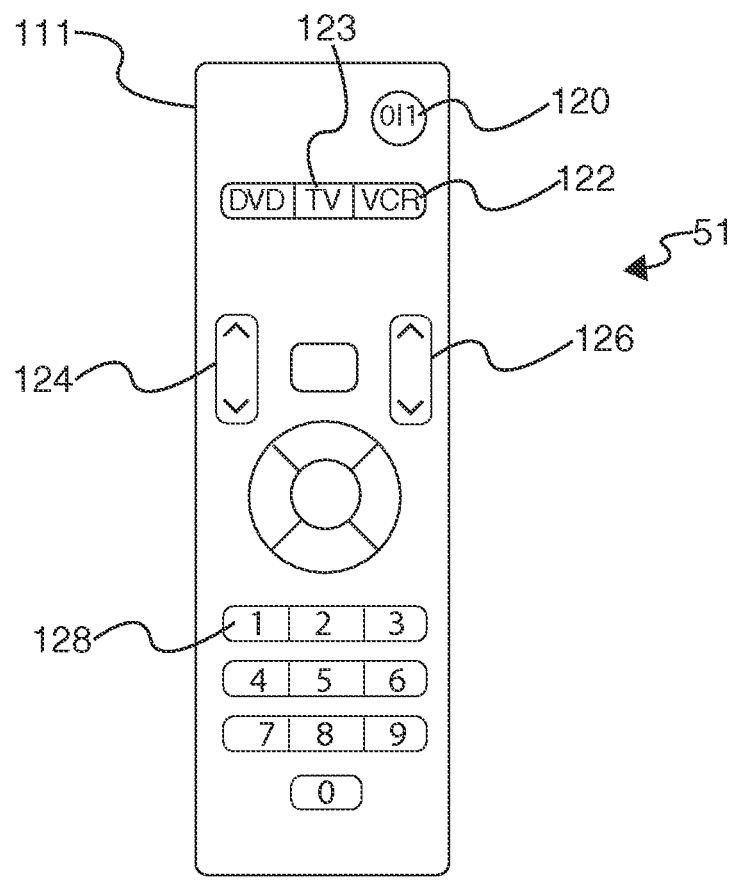
FIG. 3 illustrates a plan view of a typical remote control.

Referring to FIG. 3, a plan view of a typical remote control will be described. A typical remote control 111 includes a keypad 51. The keypad 51 has mode keys such as "VCR" 122 and "TV" 123, which control the operation of the remote control 111 (e.g., generally do not transmit a command to a device) and function keys such as on/off 120, volume up/down 124, channel up/down 126 and numbers 128. In some remote controls 111, certain buttons perform multiple operations. For example, in some remote controls 111, the on/off button 120 sends on/off commands to multiple controlled devices.

As an example of using this exemplary remote control 111 to control a first device, such as a VCR, a user presses the "VCR" mode button 122 then presses the desired function button(s) (e.g., channel up 126) resulting in the channel-up command associated with the VCR being sent to the VCR. To control a second device, such as a television, the user presses the "TV" button 123 then presses one of the function buttons (e.g., channel up 126) resulting in the channel-up command associated with the television 5 being sent to the television 5.

Referring to FIG. 4, a first data structure of a typical remote control will be described. In this exemplary data structure 64, the command structure for a particular code set CM5 is represented as a two-dimensional array having two columns, one column for button name (function key) 66 and the other for button value (function key value) 68. In this simplified example, button names for volume control 70, channel control 72, on/off 74, the digit "1" 76 and the digit "2" are shown along with their respective command values of 3A20 80, 3A2F 82, 3AE2 84, 2C01 86 and 2C02 88. The data structure 64 is just one way to represent a command structure and others are known in the business and equally anticipated. For example, in one embodiment, the data structure 64 is a positional array where each position represents a particular button (e.g., the 23rd position in the array represents the channel-up function). In another embodiment, the data structure 64 is a textural array of comma-separated values (e.g., channel-up=3A2F, channel-down=3A2E . . . ). Any known data representation is anticipated.

Referring to FIG. 5, a second version of the data structure of a typical remote control will be described. This view shows that the command values for one or more functions have been changed. In this simplified example, button names for volume control 70, channel control 72, on/off 74, the digit "1" 76 and the digit "2" are shown along with their respective modified command values of 2F20 80, 3A2F 82, 3AE2 84, 2C01 86 and 2C02 88. Although only the volume control 70 command value (button value) 80 has changed from 3A20 to 2F20, it is anticipated that the present invention is capable of changing any number of command values (button values 68) for any or all code sets 64. For example, a single command from the television 5 to the remote control 111 changes the entire set of values associated with a VCR device from one manufacturer/model to a second manufacture/model. In this example, the user has two VCRs and only one VCR mode key. When the first VCR is in use, the remote control 111 is programmed to operate with the first VCR code set (e.g., 031) and when the second VCR is in use, the remote control 111 is programmed to operate with the second VCR code set (e.g., 004).

Figure 6:
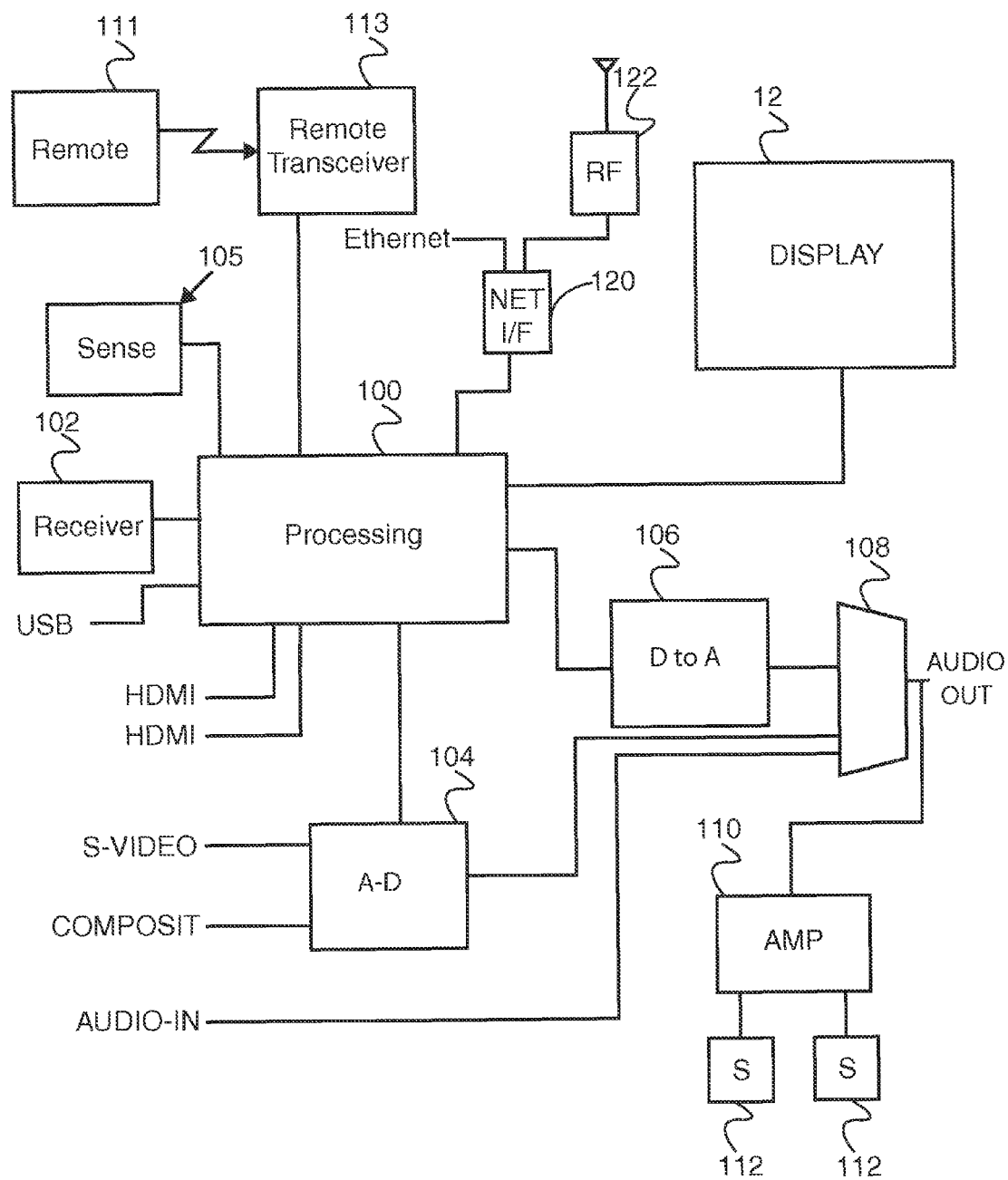
FIG. 6 illustrates a schematic view of an exemplary television system.

Referring to FIG. 6, a schematic view of an exemplary television system will be described. This figure is intended as a representative schematic of a typical television 5 and in practice, some elements are not present in some televisions 5 and/or additional elements are present in some televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from, for example, the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112.

The processing element 100 accepts commands from the remote control 111 and sends commands to the remote control 11 through remote transceiver 113, thereby providing a bi-directional interface between the television 5 and the remote control 111. Additionally, the processing element 100 sends commands to the remote control 111 through remote transceiver 113. Although IR is often used to communicate commands from the remote control 111 to and from the remote receiver 113, any known wireless technology is anticipated for connecting the remote control 111 to the processing element 100 including, but not limited to, radio frequencies (e.g., Bluetooth), sound (e.g., ultrasonic) and other spectrums of light. In some embodiments, the remote control 111 communicates with the remote receiver 113 using both infrared and radio frequencies.

In some embodiments, an ambient light sensor 105 is interfaced to the processing element 100. In such embodiments, the processing element 100 measures the current room lighting conditions and, responsive to such, adjust the brightness of the display panel 12.

A network interface 120 is present in some embodiments of a television 5 for connecting the processing element 100 to peripherals connected by, for example, Ethernet or wireless peripherals connected by radio frequencies such as WiFi/802.11 through an RF transceiver 122 and for connecting the television 5 to the Internet.

Figure 7:
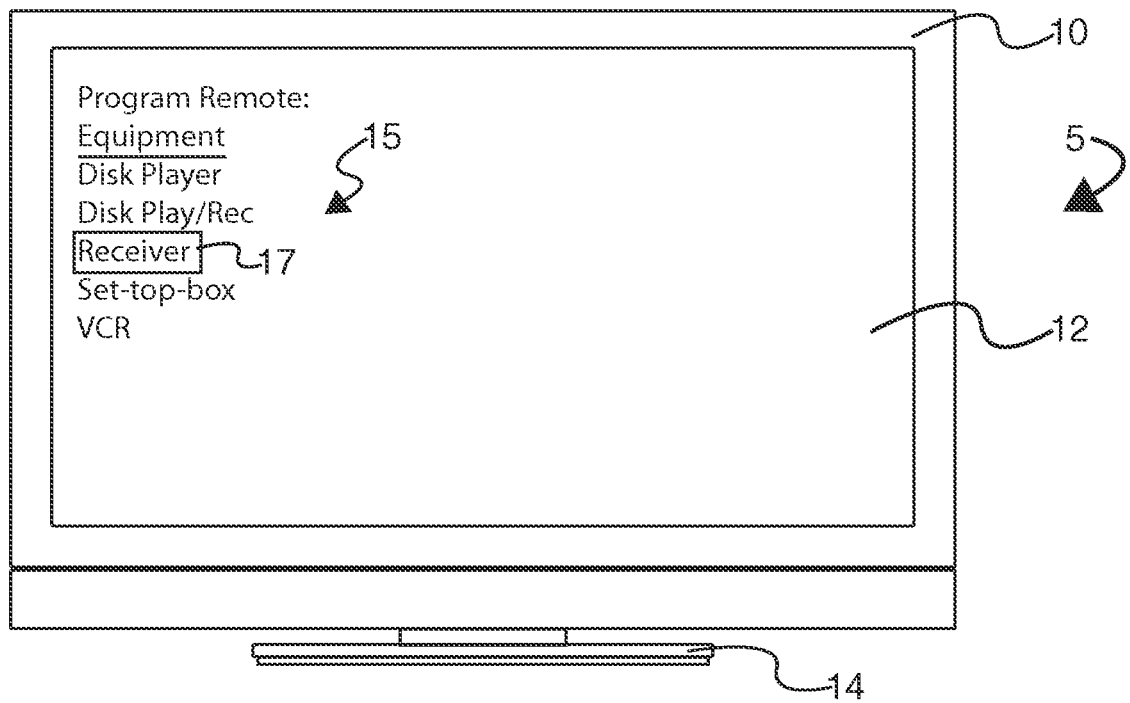
FIG. 7 illustrates a first schematic view of a television with an exemplary remote control programming user interface.

Referring to FIG. 7, a first schematic view of a television 5 with an exemplary remote control programming user interface will be described. There are many user interfaces anticipated and the examples of FIGS. 6 and 7 are simplified examples of such.

Figure 8:
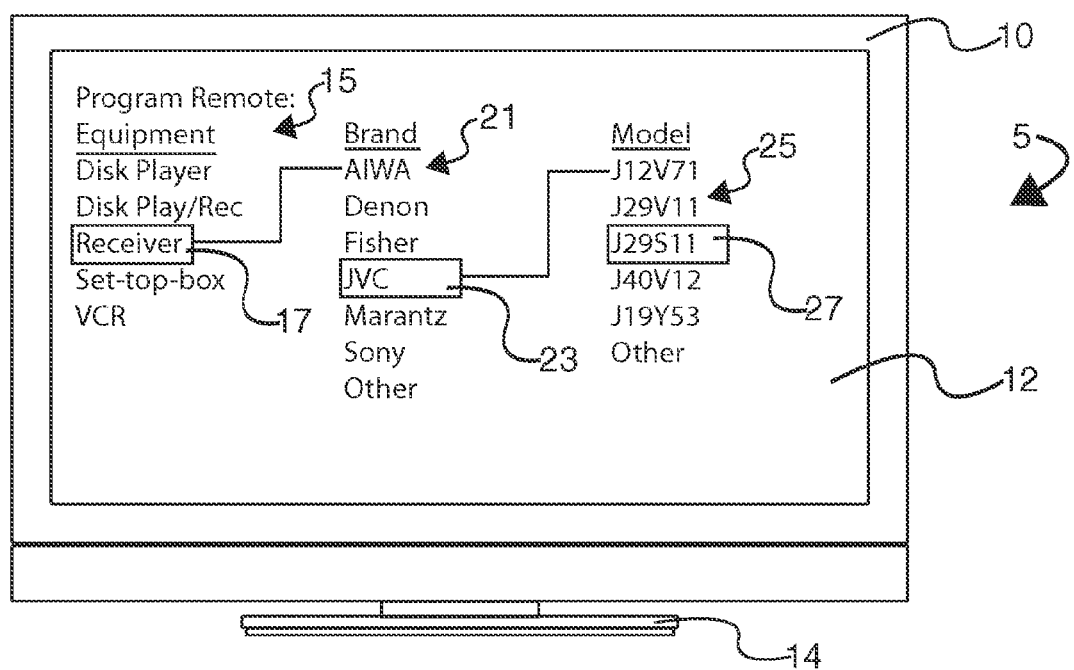
FIG. 8 illustrates a second schematic view of a television with an exemplary remote control programming user interface.

When first accessed, the on-screen display 15 is displayed on the display panel 12 showing a list of types or categories of devices that are supported by the remote control 111 (e.g., disk player, receiver, set-top box, VCR, etc.). The selection for Receiver is shown highlighted 17, indicating that a user is about to set up the Receiver (or auxiliary) mode of the remote control 111. Typically, in such a user interface, the user maneuvers the selection indicator (e.g., highlighted text 17 in this example) to the desired selection using up/down arrow keys on a remote control 111. Once the proper selection is indicated by the selection indicator, the user presses a different button on the remote control 111, such as "Select," at which time the television acts on the selection and the user interface progresses as shown in FIG. 8. There are many known user interfaces, all of which are included here within.

Referring to FIG. 8, a second schematic view of a television 5 with an exemplary remote control programming user interface is shown. In this view, the user has pressed the select key on the remote control 111 and a list of receiver brand names 21 is displayed. The user has selected JVC 23 and pressed the select again and a list of models 25 is displayed. Note that FIG. 8 describes but one embodiment in which a database of brand/model/code-set is available. Generally, model numbers are not currently included in remote databases. In such, once the device type (e.g., Receiver 17) and brand (e.g., JVC 23) are selected, the user must go through a trial and error process of trying a code set associated with the type and brand and their television to see if the device responds to that code set, typically powering on or off the device.

The user has selected J29S11 27. Upon pressing the select (or any pre-designated button on the remote 111) again, the remote control 111 will be sent commands from the television to program the associated mode (receiver) with the correct code set for the JCV J29S11 receiver. It is anticipated that other user interfaces will work equally as well. For example, another user interface is anticipated in which brand and model is entered for multiple devices, then once everything has been selected or the user determines the correct code set for the device through multiple trials, an execute user interface is activated and all commands are sent at one time to the remote control 111.

It is anticipated that the television 5 will be pre-configured with a set of device tables with lists of manufacturers and, in some embodiments, model numbers and associated remote control commands already populated. Because the home entertainment industry is constantly changing with new products being added every day, it is anticipated that some brands and models within existing brands will not be in the pre-populated dataset. To account for this, the user interface includes a brand of "other" and a model of "other." When these are selected, an attempt is made to find more brands and/or models through an Internet connection. For example, if Hitachi begins marketing a new DVD player, model H8221 after the television 5 is manufactured, this model number will not appear in the list 25. Being such, the user selects other and the television finds the new model on the Internet and adds that to the selection list. In an alternative embodiment, updates are made automatically. For example, periodically (e.g., once per week), the processing element 100 accesses an entity on the Internet to obtain updated lists of brands and models or, after selecting a device type, the entity is consulted to determine if there are any new brands, just before the list of brands is presented to the user.

Figure 9:
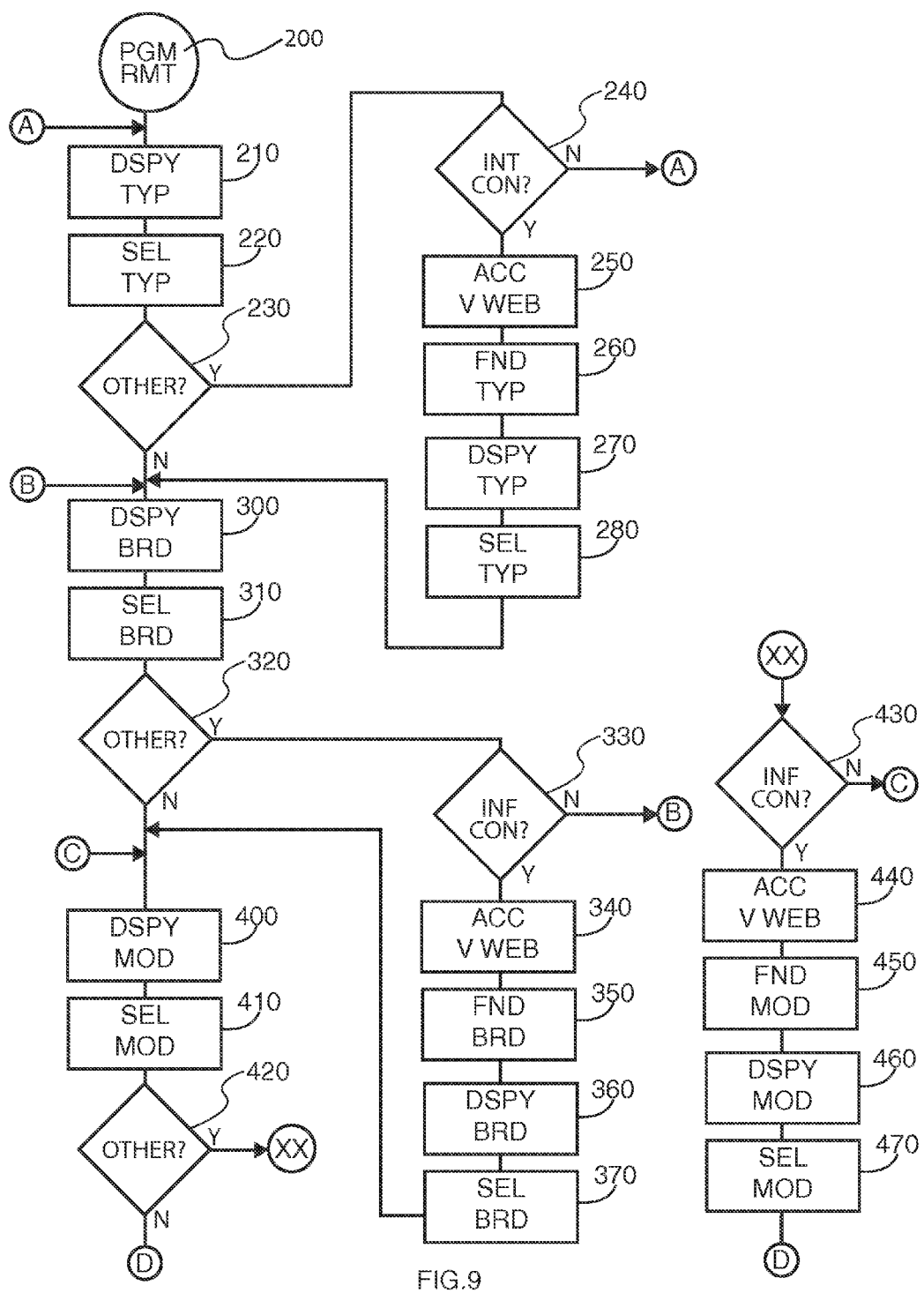
FIG. 9 illustrates a flow chart of a first exemplary user interface.
Figure 10:
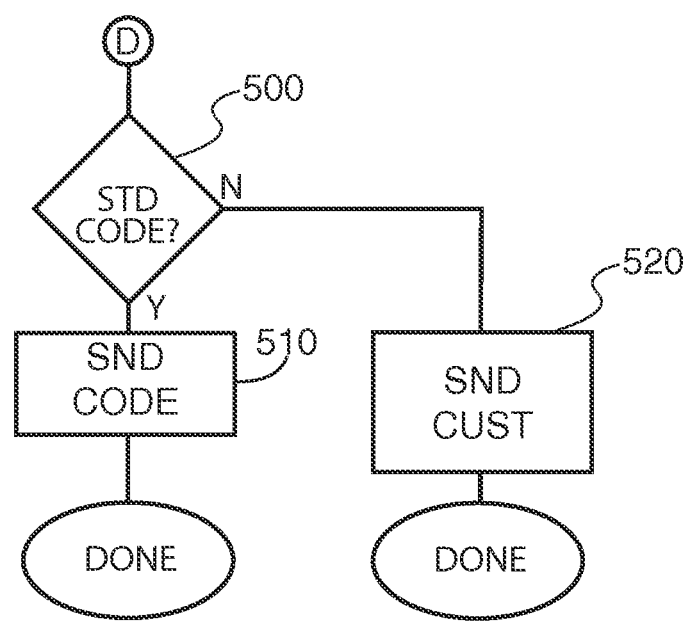
FIG. 10 illustrates a continuation of the flow chart.

Referring to FIGS. 9 and 10, a flow chart of a user interface will be described. This is an exemplary program flow executed within the processing element 100 upon initiation 200 of the remote programming user interface. It is anticipated that, within the processing element 100, there is a table of some or all known devices organized by device type, device manufacturer and model number along with an associated remote control code set (e.g., an industry standard code set value). It is also anticipated that, due to industry changes, that this table will become out of date and lack certain newer devices. Therefore, it is anticipated that the present invention provides for ways to update this table as newer devices are added. One such method is described below, though many methods are anticipated.

This exemplary program first displays a list of device types 210 (e.g., VCR, DVD, etc.) then accepts 220 a selection from the user. If the selection is other 230 and there is no active Internet connection 240, no action is taken and the flow continues at step 210. If the selection is other 230 and there is an active Internet connection 240, then a host is accessed 250 (for example, a web page maintained by the manufacturer of the television 5) to find more types of devices 260 (e.g., a new type of device might be a video download system). The new types (and old) are displayed 270 and the user selects a device type 280 from the list.

Once the device type is selected, a list of device brands is displayed 300 and the user selects one of the brands from the list 310. If the selection is other 320 and there is no active Internet connection 330, no action is taken and the flow continues at step 300. If the selection is other 320 and there is an active Internet connection 330, then a company host (or manufacturer's host) is accessed 340 (for example, a web page maintained by the manufacturer of the television 5) to find more brands of the particular device type 350 (e.g., a new manufacturer of DVD players has entered the market). The new brands (and old) are displayed 360 and the user selects a brand 370 from the list.

Once the brand is selected, in some embodiments, a list of models for that particular brand is displayed 400 (e.g., when the database contains model numbers) and the user selects one of the models from the list 410. If the selection is other 420 and there is no active Internet connection 430, no action is taken and the flow continues at step 400. If the selection is other 420 and there is an active Internet connection 430, then a company host or the manufacturer's host is accessed 440 (for example, a web page maintained by the manufacturer of the devices maintains a list of all devices and their associated remote control commands or code sets) to find more models of the particular device type from the particular manufacturer 450 (e.g., a new DVD player from JVC). The new models (and old) are displayed 460 and the user selects a model 470 from the list.

Referring to FIG. 10, if the device selected (type, manufacture, model number) has an associated standard code set (e.g., Disk Player 24 has a code set of 031) 500, then a command is sent 510 from the television 5 to the remote control 111 to set the code set for that type (mode of the remote control 111) to the associated code set (e.g., DVD player 031). If the device selected (type, manufacture, model number) does not have an associated standard code set (e.g., DVD player uses individual key programming) 500, then a series of commands are sent 520 from the television 5 to the remote control 111 to set the individual keys of the remote control 111 to the associated individual values (e.g., set play=02C3, pause=02C5). Similarly, in some embodiments, the television 5 retains the code set and commands the remoter 111 to send the proper codes to the device on an individual remote 111 key-by-key basis.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A television system comprising:
a display panel;
a processing element interfaced to the display panel;
a remote control interface, the remote control interface being a wireless interfaced to the television over a bi-direction interface;
a table containing a plurality of entries, each entry representing a device type, a manufacturer and a remote control code set;
said remote control interface receiving a command that controls selecting an entry in the table by providing options of different peripherals to be controlled from the table, by providing manufacturer names and model names for different peripherals to be controlled based on data stored in the table, where one of the model names for a first manufacturer includes an option for other model names other than the model names that are stored, and where selecting the other model names automatically causes update of data in the table to include new model information for the first manufacturer, and where the new model information is thereafter used as options for model names for the first manufacturer; and said remote control interface also transmitting the remote control code set from the one of the entries from the television to the remote control over the bi-direction interface.

2. The television of claim 1, wherein the processing element updates the table from an Internet.

3. The system of claim 1, wherein the bi-direction interface between the television and the remote control uses infrared.

4. The system of claim 1, wherein the entries of the table further represents a device model.

5. The system of claim 1, wherein the code set is an industry standard remote control code set.

6. The system of claim 1, wherein the code set is a sequence of individual remote control key command values.

7. A television system comprising: a display panel; a processing element interfaced to the display panel; a remote control interface, the remote control interface wirelessly receiving and transmitting over a bi-directional interface; a table containing a plurality of entries, each entry representing a device type, a manufacturer, a model number and a remote control code set;

said processing element operating to presents contents of the table, the processing element also operates to select one of the entries in the table by providing options of different peripherals to be controlled from the table, by providing manufacturer names and model names for different peripherals to be controlled based on data stored in the table, where one of the model names for a first manufacturer includes an option for other model names other than the model names that are stored, and where selecting the other model names automatically causes update of data in the table to include new model information for the first manufacturer, and where the new model information is thereafter used as options for model names for the first manufacturer; and the processing element also transmitting a remote control code set corresponding to the one of the entries from the television to the remote control over the bi-directional interface to program the remote control to control of a device associated with the one of the entries of the table.

8. The television system of claim 7, wherein the processing element updates the table from a database external to the television.

9. The television system of claim 7, wherein the processing element updates the table from an Internet.

10. The system of claim 7, wherein the code set is an industry standard remote control code set.

11. The system of claim 7, wherein the table further comprises a model number.

\* \* \* \* \*